(12) United States Patent
Shobatake et al.

(10) Patent No.: US 6,654,607 B1
(45) Date of Patent: Nov. 25, 2003

(54) METHOD AND APPARATUS FOR ENABLING AND MONITORING MOBILE COMMUNICATION ACROSS PLATFORMS

(75) Inventors: Yasuro Shobatake, Morristown, NJ (US); Faramak Vakil, Bedminster, NJ (US)

(73) Assignees: Toshiba America Research, Inc., Morristown, NJ (US); Telcordia Technologies, Morristown, NJ (US)

(*) Notice: Subject to any disclaimer, the term of this patent is extended or adjusted under 35 U.S.C. 154(b) by 0 days.

(21) Appl. No.: 09/504,106

(22) Filed: Feb. 14, 2000

(51) Int. Cl.[7] ............................................. H04Q 7/20
(52) U.S. Cl. ..................... 455/433; 455/432; 370/466
(58) Field of Search .............................. 455/433, 432, 455/445, 552, 424, 426; 370/466, 467

(56) References Cited

U.S. PATENT DOCUMENTS

| | | | | |
|---|---|---|---|---|
| 5,815,810 A | * | 9/1998 | Gallant et al. ............... | 455/433 |
| 5,878,343 A | * | 3/1999 | Robert et al. ............... | 455/424 |
| 5,901,352 A | * | 5/1999 | St-Pierre et al. ........... | 455/426 |
| 5,933,784 A | * | 8/1999 | Gallagher et al. .......... | 455/552 |
| 6,125,122 A | * | 9/2000 | Favichia et al. ............ | 370/466 |

FOREIGN PATENT DOCUMENTS

WO    WO 98/02011 A1    1/1998

OTHER PUBLICATIONS

Shoichi Hirata et al., "PDC Mobile Packet Data Communication Network," 1995 Fourth IEEE International Conference on Universal Personal Communications Record. Gateway to the 21st Century. Tokyo, Nov. 6–10, 1995, New York (ISBN 0–7803–2855–4) pp. 644–648.

Wanjiun Liao, "Mobile Internet Telephony: Mobile Extensions to H.323," Infocom '99. 18th Annual Joint Conference of the IEEE Computer and Communications Societies, Mar. 21–25, 1999, New York (ISBN 0–7803–5417–6) pp. 12–19.

Christian Wietfeld, "Seamless IP–based Service Integration Across Fixed/Mobile and Corporate/Public Networks," Vehicular Technology Conference, 1999 IEEE 49th Houston, TX May 16–20,1999 (ISBN 0–7803–5565–2) pp. 1930–1934.

* cited by examiner

*Primary Examiner*—Vivian Chin
*Assistant Examiner*—E. Lockett
(74) *Attorney, Agent, or Firm*—Banner & Witcoff, Ltd.

(57) ABSTRACT

A system and method for communicating across various communication platforms is disclosed. The system includes a mobility manager that includes a database that stores the alias of terminals on other platforms for addressing from a first platform. Through use of the disclosed system and method, communication across platforms is enabled while minimizing modifications needed to further the communication pathways.

16 Claims, 19 Drawing Sheets

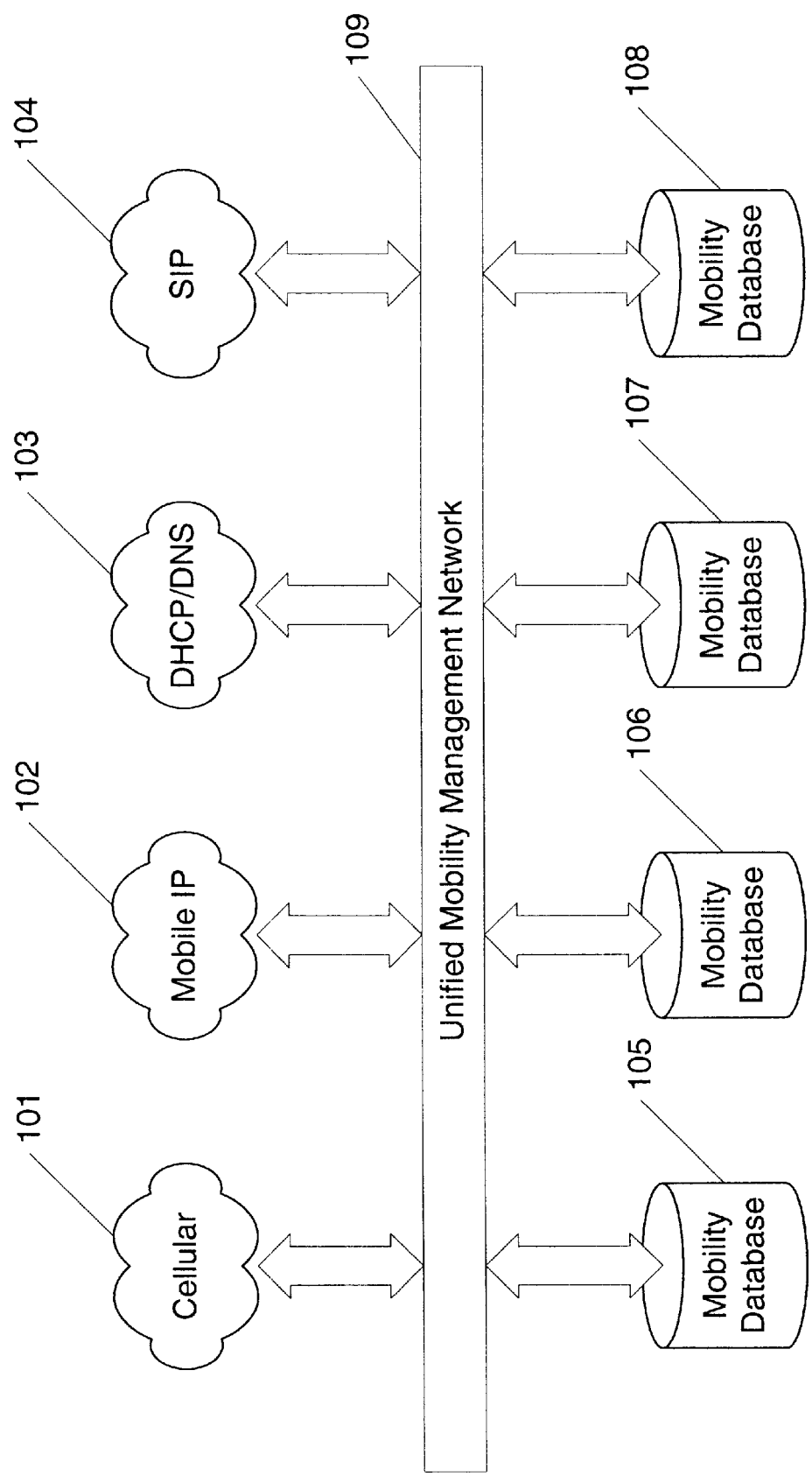

METHOD AND APPARATUS FOR ENABLING AND MONITORING MOBILE COMMUNICATION ACROSS PLATFORMS

BACKGROUND

A. Technical Field

The disclosure generally relates to mobile communications. More particularly, the disclosure relates to managing various mobile communication protocols in a unified manner.

B. Related Art

In recent years, the demand for mobile communications has steadily increased. With the increase in demand, the mobile communications industry has incorporated a variety of different protocols. Accordingly, a system for interworking the various accepted protocols is needed.

Varieties of mobile communication protocols are available including cellular, mobile IP, DHCP/DNS and SIP. While the protocols vary in how they function, each implementation of the protocol needs to support standard functions including location registration, location resolution, authentication, authorization, and accounting. Location registration relates to a mobile terminal announcing and receiving confirmation of its location within a network or platform. Location resolution relates to the determination of where a mobile terminal is in a network. Authentication relates to a function of a network determining whether a certain mobile user is a confirmed user of a network through interactions with at least one database. Authorization relates to a function of a network determining whether a certain mobile user is allowed to use a service of the network through interactions with at least one database. Accounting relates to a function of a network monitoring and assessing fees to a certain mobile terminal. Authentication, authorization, and accounting are referred to generally as "AAA" functions. In general, location registration occurs at the power-on phase of a terminal and during the handoff of a terminal between sites in a network. At the same time, authentication may be performed. Location resolution generally occurs when a first terminal attempts to set up a communication channel with a second terminal. Again, authorization may be performed at this time for both the first terminal and the second terminal. Accounting is generally performed while a terminal is actively communicating with another terminal. For simplicity, the terminal initiating a communication is herein referred to as the "caller" and the terminal attempting to be contacted is the "callee."

For purposes herein, a platform may be defined as a portion of a network where identical signaling protocols handle the operations of connection set-up, connection tear-down, hand-off, location registration, location resolution, and accounting (or charging). Moreover, a platform may be a portion of a network that is provided by one operator, even if the signaling protocol for Operator A's network is the same as the protocol as Operator B's network. For example, one operator (for example, Bell Atlantic Mobile) may have a number of platforms within the network controlled by the operator. The first platform would use CDMA, the second would use Analog AMPS, and the third would use Mobile IP, etc. In the latter case, the border between platforms using identical protocols but operated by different operators is controlled by a mobility database. Each operator manages its mobility database independently.

A number of the above-described functions are performed in databases connected to the network servicing the terminals. FIG. 1 shows a conventional arrangement for mobile communication networks as including databases. The databases store various information for terminals including the terminals' terminal identification (TID), the terminals' location identification (LID), passwords, permission lists, and accounting information. It is noted that some platforms do not support the concept of a mobility database and a common LID format.

As shown in FIG. 1, each network has a mobility database as including the TID, LID, and other information for each terminal serviced by it. For example, cellular network 101 (for instance a 1G/2G cellular network) includes mobility database 105 called a HLR (Home Location Register), which stores an E.164 number as the TID, platform-specific information as LID, a set of platform-specific information as the password permission list and accounting list. The VLR (Visitor Location Register), which stores a copy of the information stored in the HLR, may be used in the well-known cellular network system in order to reduce traffic regarding location registration and accounting.

Mobile IP network 102 includes mobility database 106 called HA (Home Agent), which stores IP address as TID and LID, a set of platform-specific information as password, permission list and accounting list. The current standard of Mobile IP (RFC2002) includes a special function called FA (Foreign Agent), which handles Mobile IP-specific functionalities. However, these Mobile IP-specific functionalities are well-known and are beyond the scope of the invention. DHCP/DNS network 103 includes mobility database 107 called Domain Name System, which stores Host Name and Domain Name as TID, IP address as LID, and a set of platform-specific information as password, permission list and accounting list. Here, DHCP (Dynamic Host Configuration Protocol) may be used for assigning an IP address at an access point where a Mobile Terminal currently visits. Also, the dynamic DNS currently discussed at IETF may be used for advertising the assigned IP address to the whole network. SIP network 104 includes mobility database 108 called SIP Proxy, which stores SIP URL as TID and LID, and a set of platform-specific information as password, permission list and accounting list.

An end user desires the ability to communicate with anyone, irrespective of the network in which the called party (or callee) is located. Because each of these networks has different protocols, no direct connection is possible. Further, higher order functions (including authentication, authorization, and accounting) of a terminal on a foreign network are not possible as no interchange of information between the mobility databases 105–108 exists.

A system has been proposed that attempts to coordinate IP and non-IP communications. A white paper by Cisco Systems describes Cisco's architecture for voice/video/data integration on the Internet. The paper relates to providing a method of internetworking among plural mobile platforms including IP-based platforms. Specifically, the paper defines a four layer architecture including a clients level 112, an infrastructure level 111, a call processing level 110, and an application level 109 as shown in FIG. 1B. The application level 109, which is open to development by other entities, is provided to realize sophisticated services like Unified Messaging. The call processing level 110 functions as a call manager in that it controls voice calls on the Internet. The call manager provides the traditional phone's "look and feel" to IP-based voice applications. Also, if required, the call manager handles the internetworking between IP and PSTN communications as shown in FIG. 1C. FIG. 1C includes an P-based network 114 (including routers and the like) and a PSTN network 115. An example of the initiation of a call is provided. IP-based terminal 119 provides a request to call manager 116 to place a call. The call manager 116 exchanges control information with the call setup portion 117 for the PSTN network 115 servicing PSTN terminal 118. Once all information has been exchanged, a call is established between IP-based terminal 119 and PSTN terminal 118 through physical link gateway 113. The call manager 116 controls the physical link gateway 113 to set up the desired call. While disclosing a method for interworking IP telephony and PSTN, the above-described system fails to disclose mobility-related functions.

Another approach has been suggested by TIA (the Telecommunications Industry Association). TIA supports the TR45.6 architecture for implementing IP service. This architecture has two tiers including an access network and a core network. Referring to FIG. 1D, the core network is represented by the mobile IP-capable IP network 120. The access networks are represented by the cellular networks 123 and 124. IP network 120 includes foreign agent FA 121 and home agent HA 122 that functions as the mobility database (monitor and coordinate location registration and resolution) for this network. Each of networks 123 and 124 includes visiting location registers VLR 126 and 129 and home location registers HLR 127 and 130. The combination of the HLRs and the VLRs functions as the mobility database for these networks. It is noted that the IP network 120 is not necessarily synonymous with the Internet. The Internet is open to all traffic. IP network 120 may be part of the Internet or may be separate from the Internet. Similarly, the IP network 120 may be limited to IP communications.

Referring to FIG. 1D, if one wanted to communicate with a mobile terminal whose home network was a different cellular network than what the mobile terminal was on, then one would use the IP network 120 to transfer calls. This means the mobile terminal should be IP compatible if one wanted to communicate with other terminals on other platforms. This creates in each mobile terminal the requirement that all terminals must be IP-compatible. This limits the effectiveness of non IP-compatible mobile terminals.

OBJECTS OF THE PRESENT INVENTION

Accordingly, an object of the present invention is to provide a system and method for internetworking among plural mobile platforms.

It is another object of the invention to provide a system and method for internetworking among plural mobile platforms including the IP-based platform.

It is yet another object of the present invention to provide a system and method to realize communication between mobile terminals of different platforms.

It is a further object of the present invention to provide a system and method to realize communication between non-IP-capable mobile terminals and IP-capable mobile terminals.

These and other objects of the invention will become apparent through implementing the system described herein.

SUMMARY

The present invention relates to a unified mobility management system and method for enabling handling of communications in a unified manner. Using a unified mobility manager, a terminal may register its location with its home database in a foreign network. In addition, the terminal may be found through interactions with its home database. Further, authentication, authorization, and accounting may be performed for a terminal outside its home network through accessing its home database.

Signaling messages from a mobile terminal connected to operator A's network are routed to the mobility database operated by operator A first. If necessary, a mobility management gateway intercepts the signaling messages and redirects the messages to another mobility management database operated by the native operator of the mobile terminal.

The unified mobility manager (referred to herein as a "UMM") includes the ability to translate addresses from one protocol to another protocol across platforms. The UMM intercepts information directed for another platform and passes the received information to the desired network.

These and other novel advantages, details, embodiments, features and objects of the present invention will be apparent to those skilled in the art from following the detailed description of the invention, the attached claims and accompanying drawings, listed herein, which are useful in explaining the invention.

BRIEF DESCRIPTION OF THE DRAWINGS

FIG. 2 shows an example of a unified mobility management system in accordance with embodiments of the present invention.

DETAILED DESCRIPTION

An improved mobility management system is disclosed. FIG. 2 shows a unified mobility management network 109 located between networks 101–104 and mobility databases 105–108. The unified mobility management network 109 allows messages to be sent across network boundaries to other networks for handling. In short, the network 109 intercepts messages received or generated by a first network and routes these messages to the appropriate databases for handling.

Figure 1A:
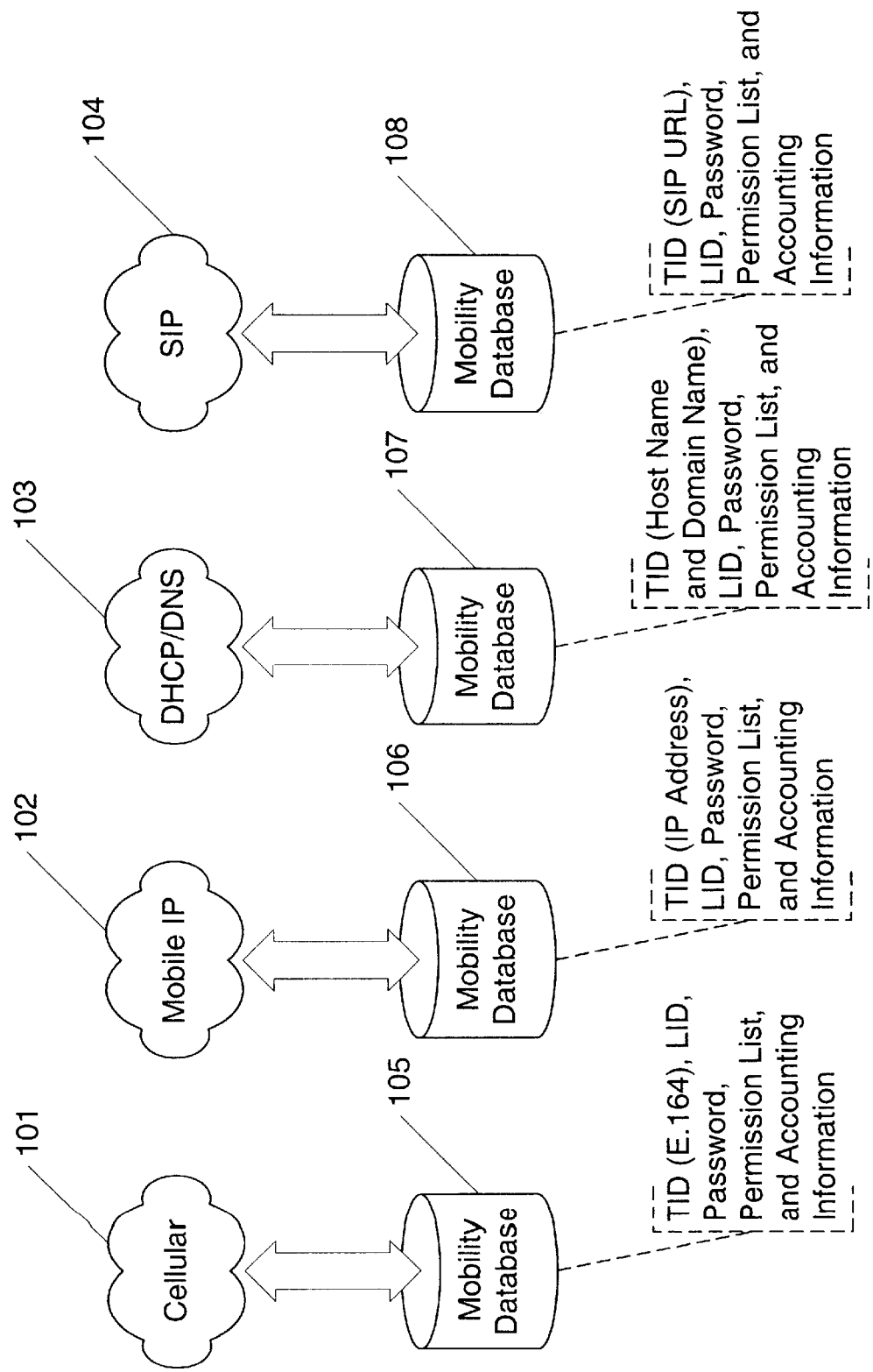
FIGS. 1A–1D show conventional arrangements of mobile networks and associated databases.
Figure 1B:
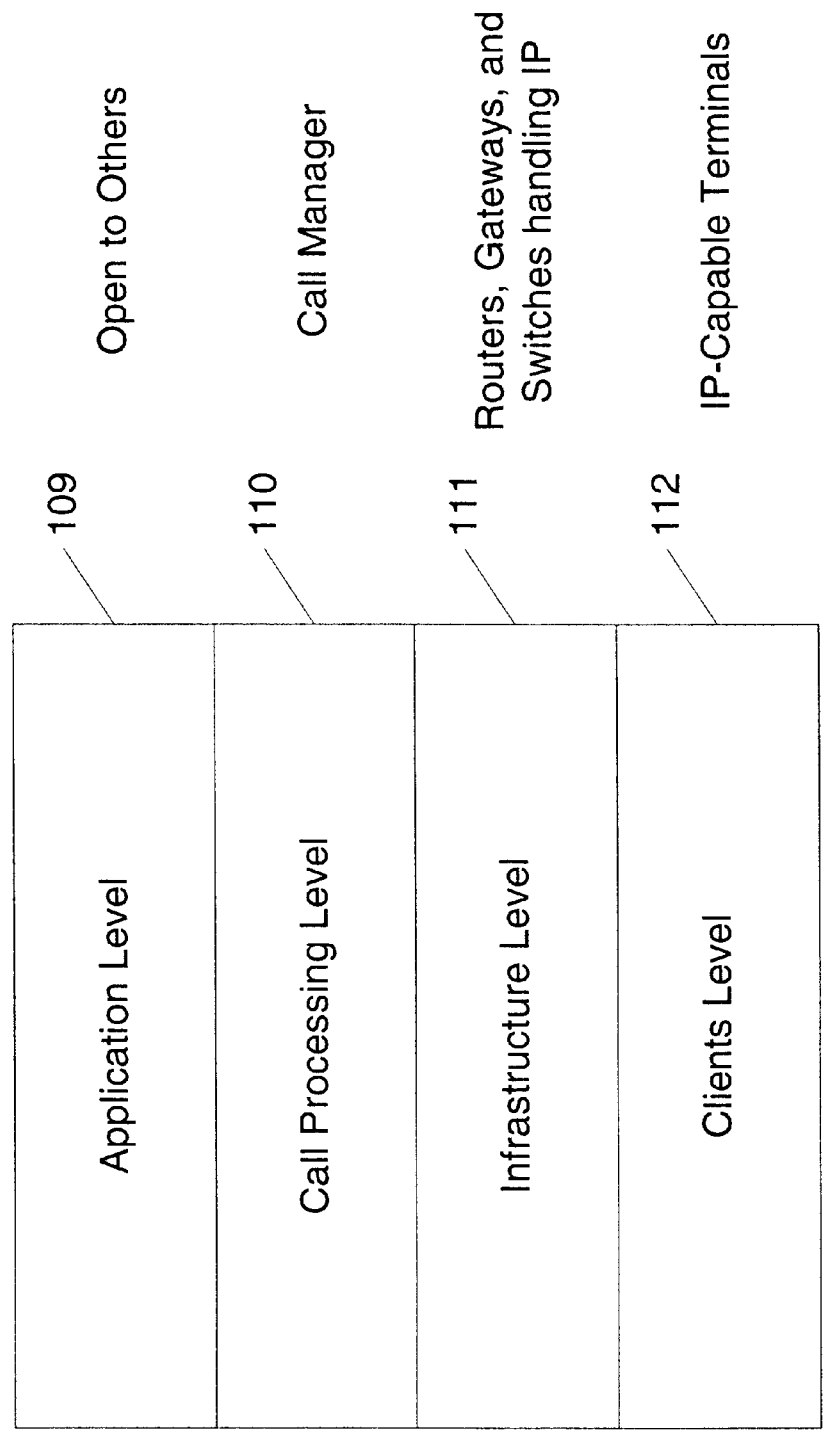
Figure 1C:
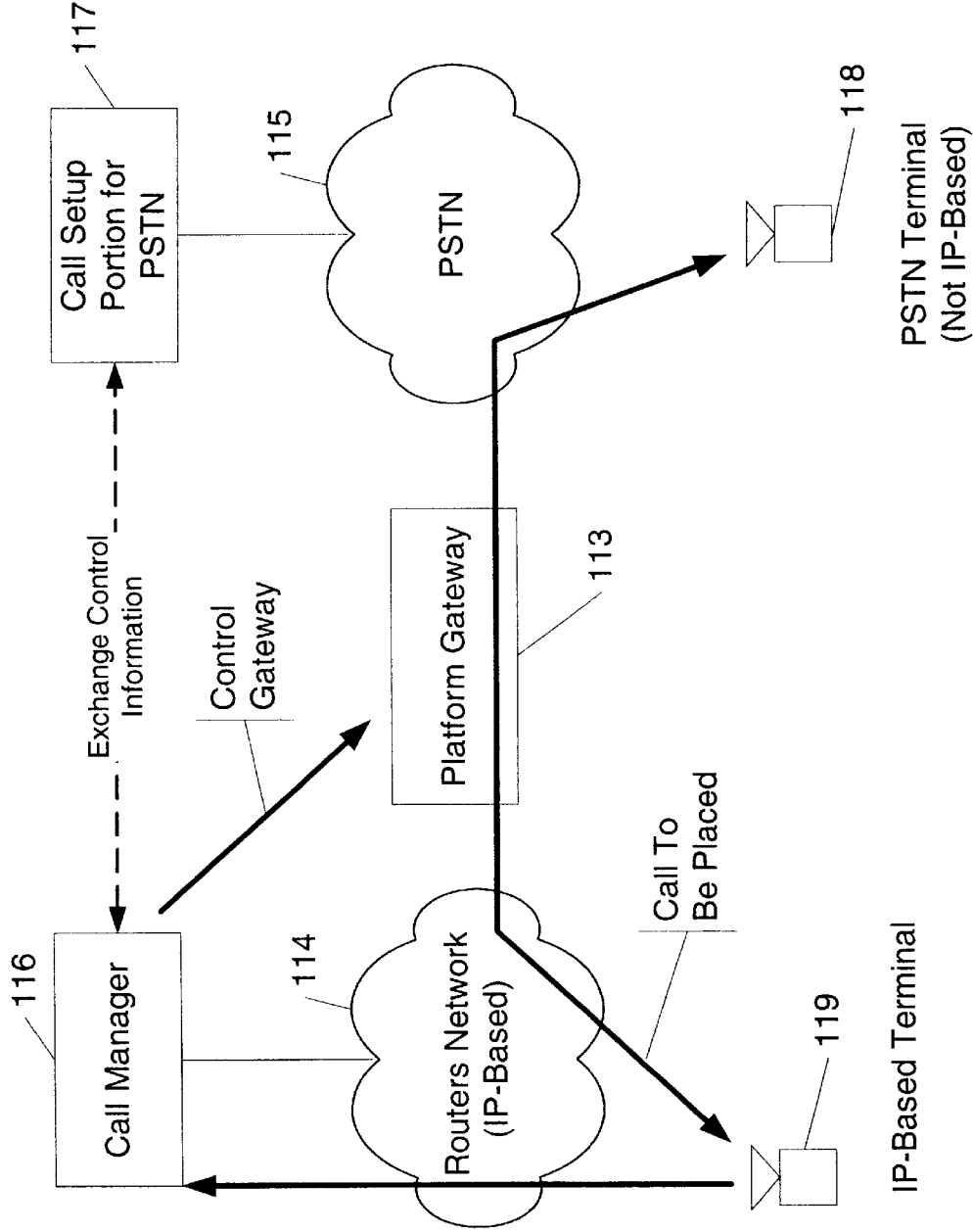
Figure 1D:
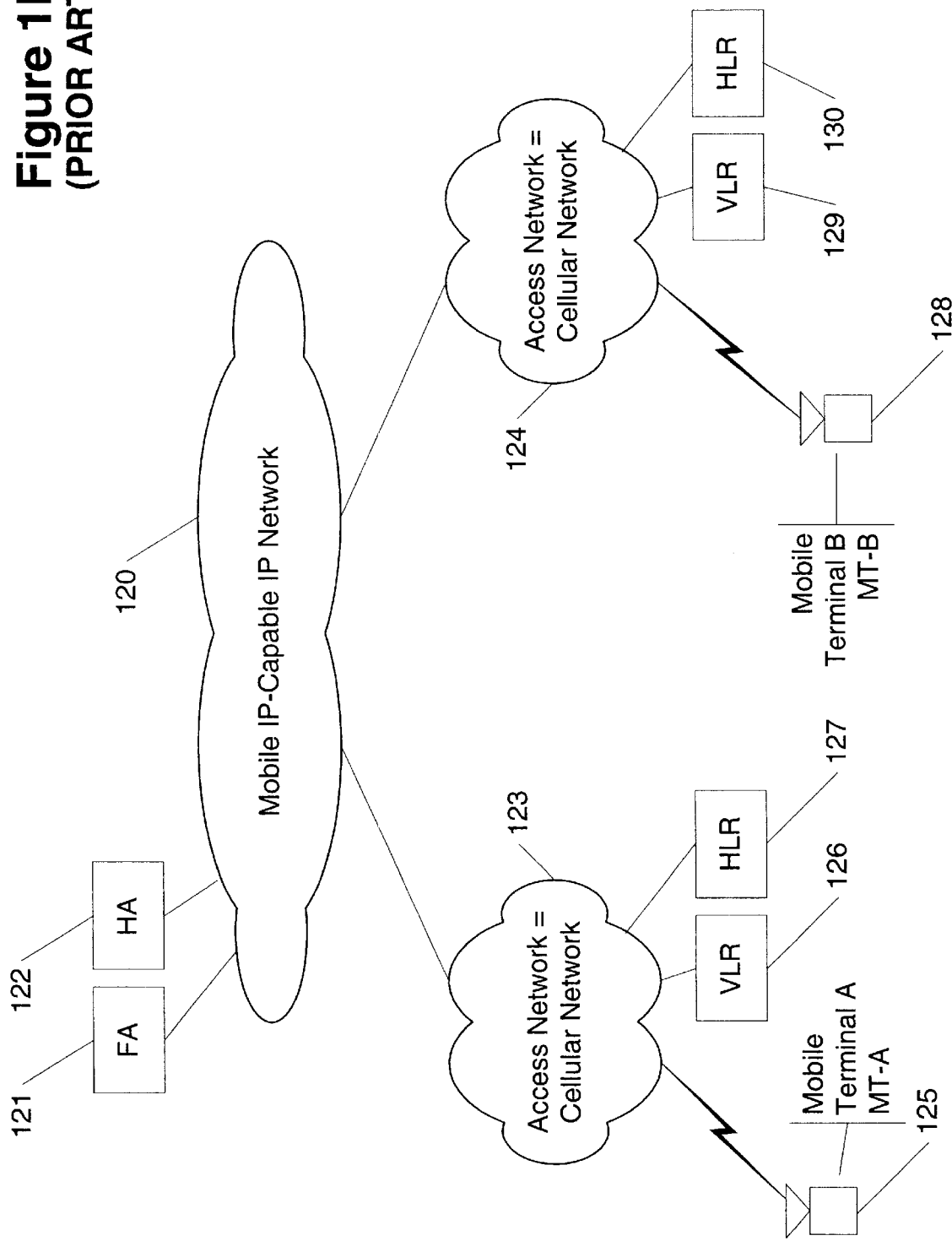
Figure 3:
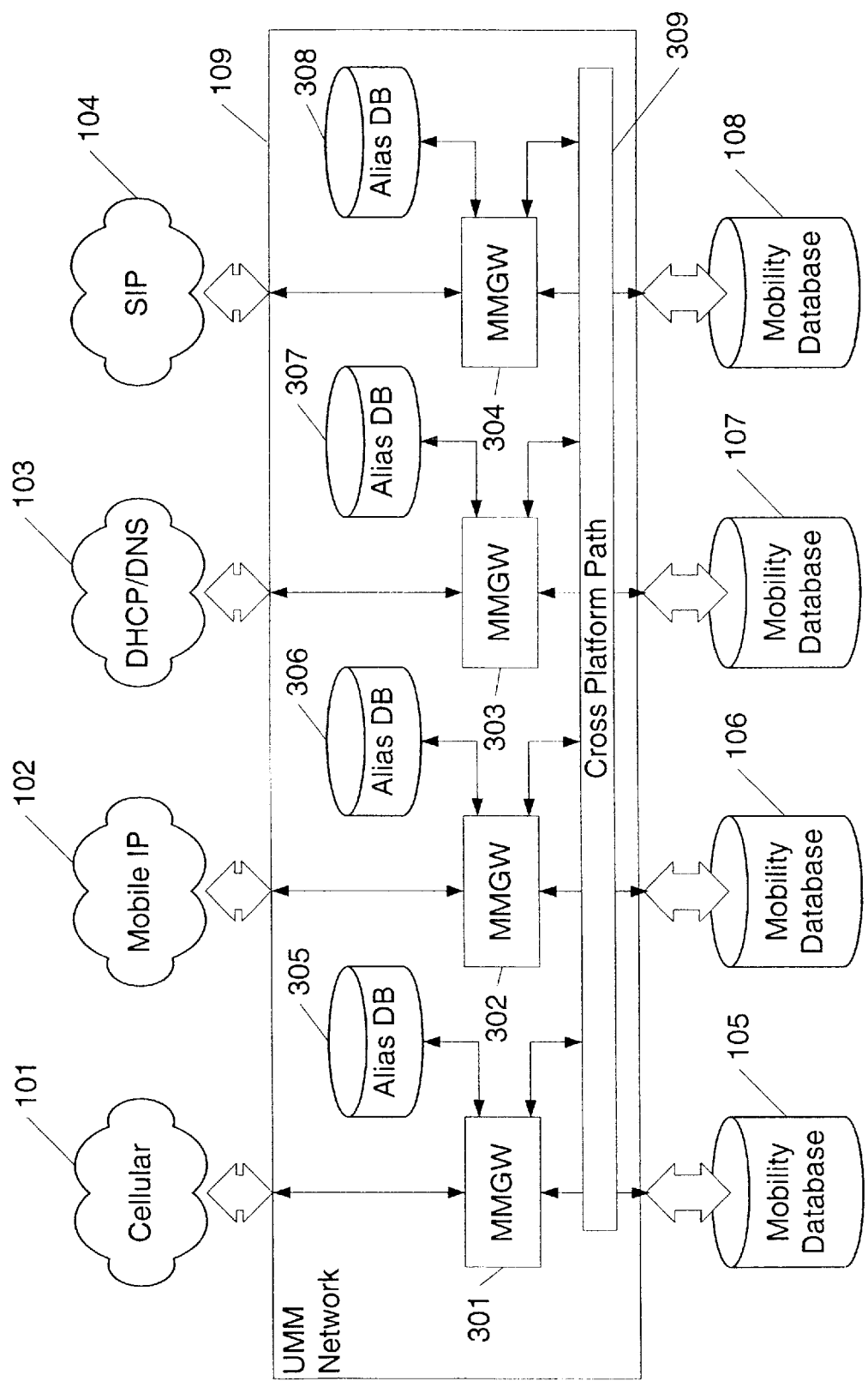
FIG. 3 shows a detailed view of the unified mobility management system of FIG. 2 in accordance with embodiments of the present invention.

FIG. 3 shows a detailed view of the unified mobility management system of FIG. 2 in accordance with embodiments of the present invention. The unified mobility management network 109 includes a mobility management gateway (represented as MMGW) 301–304 for each network 101–104. The MMGWs monitor messages that are transmitted between networks 101–104 and their respective mobility databases 105–108. When a message is received by the MMGWs 301–304 that is destined for another database, the message is intercepted and forwarded to the other mobility database by means of a cross platform path 309. The cross platform path 309 may be a functional representation of a pathway that uses the Internet as the actual transmission medium. In this instance, the Internet transmissions would have header and body information in each packet as is known in the art. An advantage of using the Internet includes the ability to transmit and receive information around an intermediate node if it fails or becomes congested with traffic. Alternatively, the cross platform path 309 may be a dedicated physical network that interconnects the mobility databases 105–108. The dedicated physical network approach has the advantage of being insulated from external traffic not related to intermobility database transactions. The cross-platform path may operate between operators or may be constructed to operate for each operator. Thus, there may be a sole cross-platform path or there may be multiple cross-platform paths connecting networks.

Each MMGW 301–304 is associated with an alias database 305–308. The alias databases 305–308 store identification information relating to mobile terminals on other platforms. In general, a mobile terminal acknowledges the existence of other terminals through its native protocol. For example, cellular terminals generally designate other terminals using E.164. In this example, cellular terminals do not provide another terminal's host name and domain name (assuming the other terminal is on a DHCP/DNS platform) to its cellular network. Further, terminals only are designed to handle their own identifiers. In this instance, cellular terminals are not designed to respond to TIDs of a SIP URL from a SIP network.

The alias databases 305–308 overcome this shortcoming by storing the identification information for terminals of other platforms in a format useable by a home platform. The information included in the alias database includes a local terminal identifier for the remote mobile terminal, the TID of the remote mobile terminal, and an identifier that identifies the remote platform. Alternatively, the identifier may be implicit in the format of the TID of the remote terminal. The information stored in the alias databases 305–308 may also include routing information to which mobile database 105–108 stores the information for the remote terminal.

An example of an entry in alias database 305 for cellular platform 101 is as follows: (212) 556-1234 is an alias for "doug.domainname.com" on the DHCP/DNS platform 103. Another example includes (800) 345-6789 as an alias for an 800 service (toll free) that is provided by "123.456.78.9" on the mobile IP network 102. Accordingly, a mobile terminal on an E.164 network may place calls to mobile terminals on other networks.

The actual entry of an alias in alias database 305–308 may take the general form of:

1) Local terminal identifier;
2) Remote terminal identifier; and
3) Platform supporting remote terminal identifier.

The third entry may be optional if only one network supporting the remote terminal identifier exists. If multiple networks exist that support the protocol but the platforms are separately owned and/or operated, one may desire to separately identify the platform to efficiently direct any messages to the appropriate mobility database 105–108.

Referring to FIG. 3, the MMGW 301 monitors information passing to and from mobility database 105. A message originating on cellular network 101 is initially routed by network 101 to mobility database 105. The MMGW 301 intercepts the message and determines whether the message is intended for mobility database 105. If so, MMGW 301 routes it to the mobility database 105. If not, MMGW 301 routes it to the appropriate database 106–108 (or even another version of database 105 operated by a different entity or in a different region). In the process of transmitting the message to other databases, MMGW may reformat the message to be compatible with the protocol of the destined database.

Figure 4:
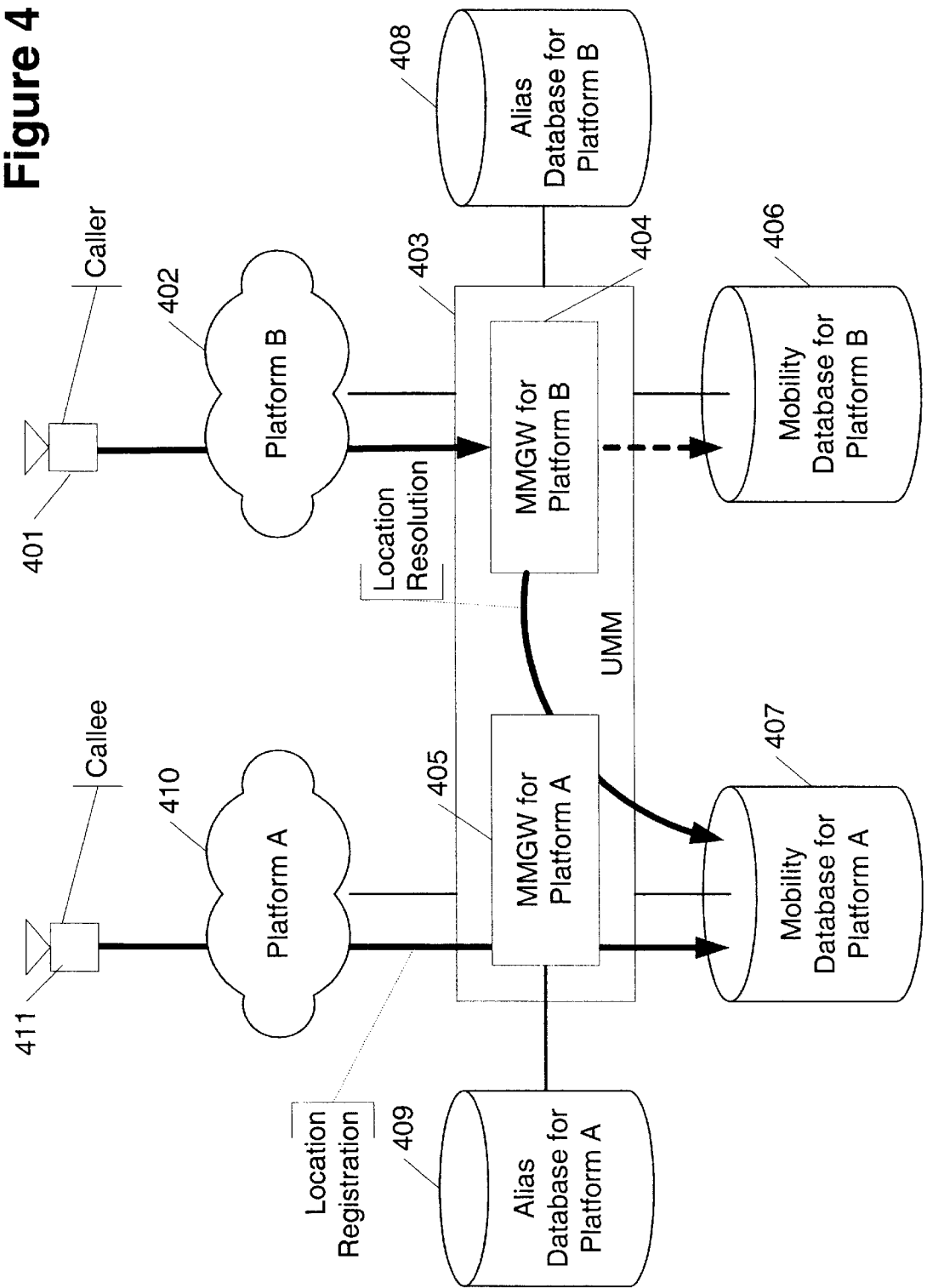
FIG. 4 shows an example of the operation of the unified mobility management system in accordance with embodiments of the present invention.

An example of the operation of cross platform call processing is shown with reference to FIG. 4. Here, caller 401 on platform B 402 desires to call callee 411 on platform A 410. Each of the caller 401 and the callee 411 has locally registered with their respective platforms (401 and 410). For this example, the native platform of caller 401 is platform B 402 and the native platform of callee 411 is platform A 410. As each of the caller 401 and the callee 411 registered locally on their platform's databases 406 and 407, respectively, the system may need to use cross-platform resolution of the location in order to complete the call. It is appreciated that an intermediate database may be used to store all locations for all terminals, eliminating the need to contact the callee's database for location resolution.

As represented in FIG. 4, caller 401 desires to place a call to callee 411. The caller 401 identifies the callee 411 by the protocol known on platform B. In this example, platform B is cellular using E.164. Therefore, caller 401 dials the telephone number (in the form of (XXX) YYY-ZZZZ) to identify callee 411. MMGW 404 in UMM 403 intercepts the telephone number dialed (or resolution request message) from caller 401 and refers to alias database 408. Through interaction with alias database 408, MMGW determines whether callee 411 is on platform B. In this example, callee 411 is not on platform B and alias database 408 returns the alias information to MMGW 404. MMGW 404 performs a conversion from platform B's protocol to platform A's protocol with information returned by alias database 408. MMGW 404 then asks for the callee's 411 current location (location resolution) on platform A.

By accessing the mobility database for the callee's native platform, the following advantages are achieved. The permission list as stored for the callee is referenced (so as to determine whether calls from caller, specifically, or from platform B, generally) are permitted. Also, by using the mobility database for platform A 407 to resolve the callee's location, MMGW 404 may then determine the appropriate routing path in the case that multiple paths exist. Depending on the accounting technique used, mobility database 407 for platform A may be used to monitor and charge for the call placed to callee. 411. In addition, the caller may be charged for the call as is known in some mobile communication plans.

Figure 5:
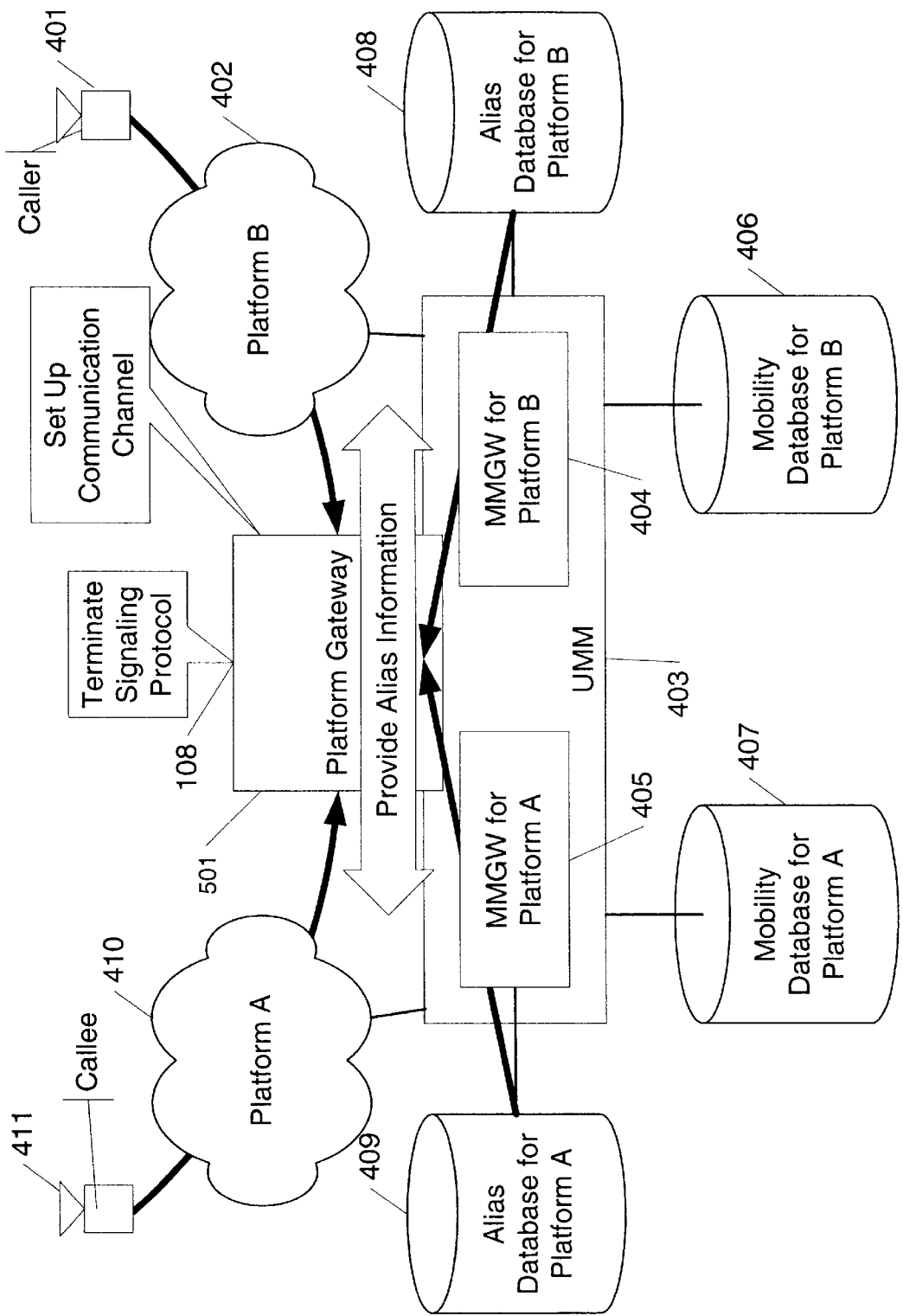
FIG. 5 shows an example of a call initiation using the unified mobility management system in accordance with embodiments of the present invention.

As shown in FIG. 5, the cross platform communication enabled by the UMM 403 is set up by platform gateway 501 located between the platforms. The platform gateway terminates the signaling protocol. The term "terminate" (as is known in the art) includes the functional aspects of "protocol processing." An example of signal termination may be found in U.S. Pat. No. 5,717,691 entitled "Multimedia Network Interface for Asynchronous Transfer Mode Communication System", whose contents are incorporated herein by reference for any essential subject matter. An example of "terminate signaling protocol" may be said to "read the contents of a message and do something as designated by the contents of the message." A list of operations that may be performed include tearing down of the communication channel, setting up the communication channel, hand-off, call accounting, location registration and location resolution.

The platform gateway 501 uses alias information from the two alias databases B 408 and A 409 to complete the channel between the caller 401 and the callee 411. The platform gateway 501 also performs functions related to handling the communications of the data path (for example when conversion is needed between asynchronous transfer modes and synchronous transfer modes). Further, the alias information received from alias databases B 408 and A 409 is used by the platform gateway 501 to establish endpoints on both sides of the gateway.

The alias information from alias database B 408 is used to create a forward communication path from caller 401 to callee 411. The alias information from alias database A 409 is used to create a reverse communications path from callee 411 to caller 401.

Figure 6:
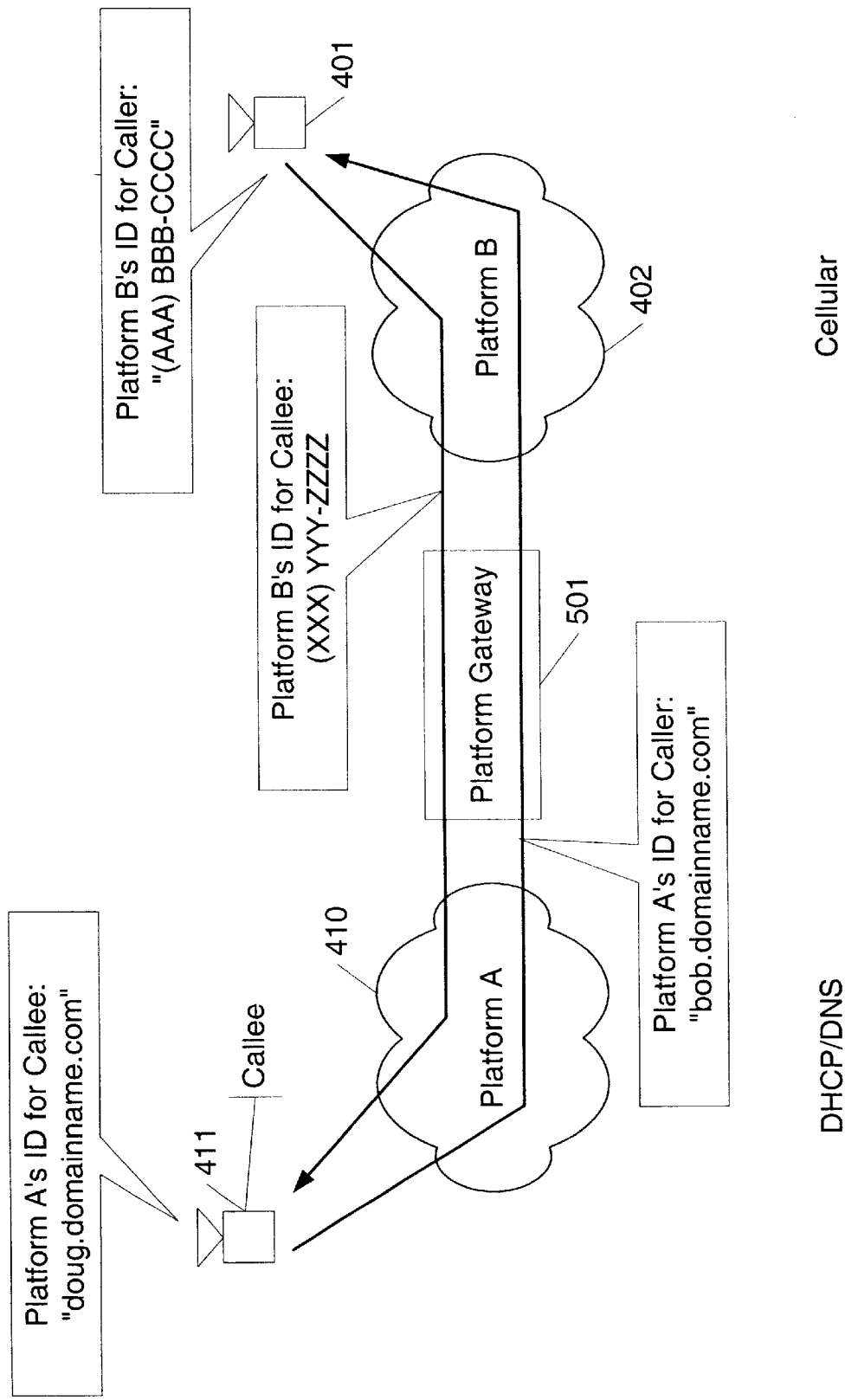
FIG. 6 shows an example of the operation of the unified mobility management system with TIDs in accordance with embodiments of the present invention.

FIG. 6 shows the communication path between caller 401 and callee 411. Caller 401's TID is "(AAA) BBB-CCCC" on platform B 402 using a cellular protocol (for example, E.164). Callee 411's TID is "doug.domainname.com" on platform A 410 using a DHCP/DNS protocol. Based on information from alias database 403, platform gateway 501 creates the forward path using the alias TID of (XXX) YYY-ZZZZ for callee 411's TID. Likewise, platform gateway 501 creates the reverse path communication channel using platform A's alias TID (here, "bob.domainname.com" to identify caller 401. Messages (or message packets) from caller 401 will be placed onto platform B with header information identifying callee 411. On platform A 402, the header information may include platform B's identification of callee as (XXX) YYY-ZZZZ. Messages with this header will be intercepted and transferred across platform gateway 501 to platform A 410. In the process, this header information (of (XXX) YYY-ZZZZ) is replaced by the actual terminal ID of callee 411 (in this instance, "doug.domainname.com"). Using the actual TID of callee 411, the messages are routed to callee 411. The return path is similarly arranged. Alias information from alias database 409 is transferred to platform gateway 501. Callee 411 outputs messages (or message packets) with header information including an identification of caller 401 as "bob.domainname.com." Platform gateway 501 receives these packets, replaces the header with the actual TID of caller 401 (here, (AAA) BBB-CCCC) and forwards the messages to caller 401.

Figure 7:
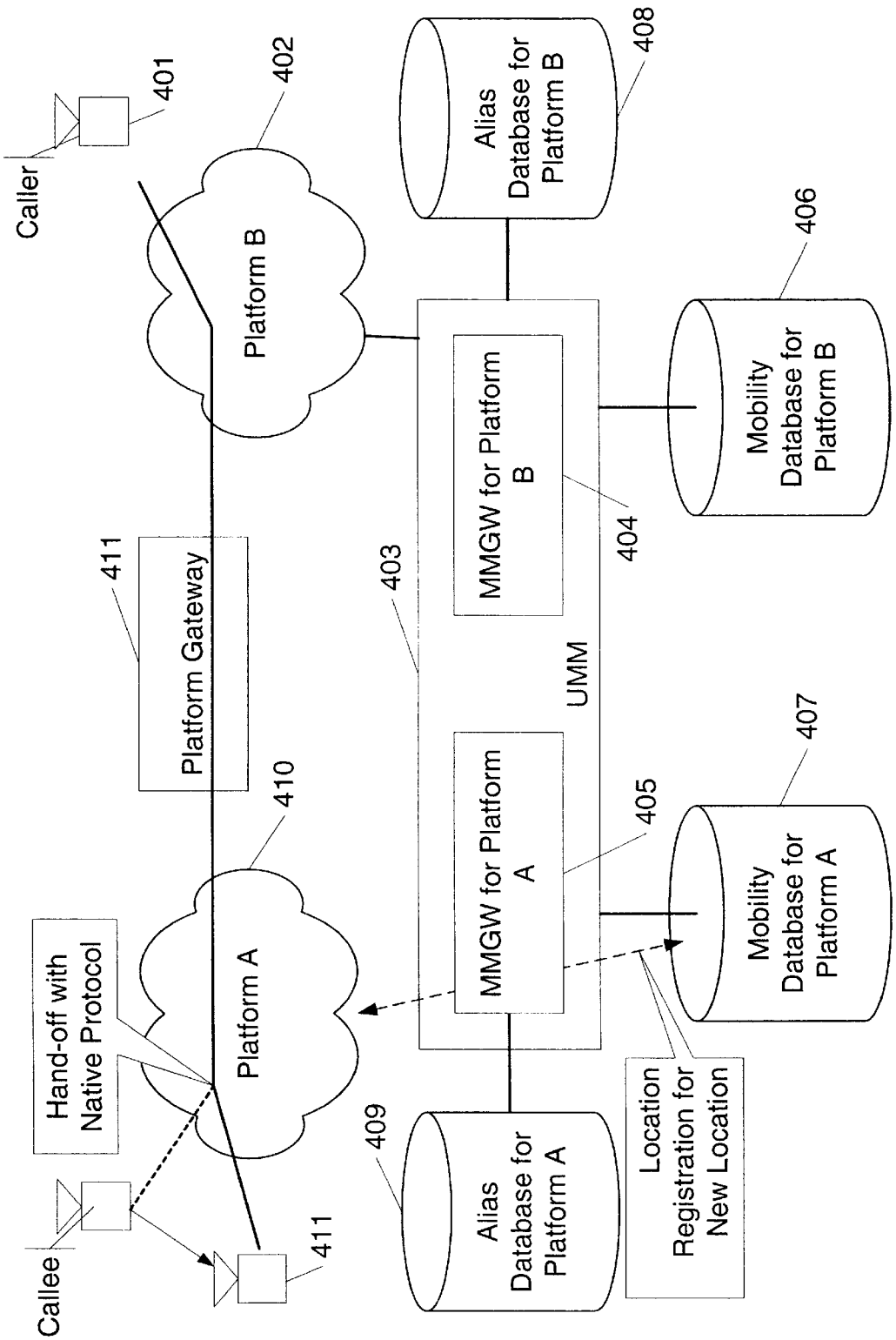
FIG. 7 shows an example of a call handoff using the unified mobility management system in accordance with embodiments of the present invention.

FIG. 7 shows an example of a call handoff using the unified mobility management system in accordance with embodiments of the present invention. Callee 411 moves from one site service addressed by platform A 410 to another site in platform A 410. As callee 411 moves, it re-registers its location with mobility database 407. As messages for callee 411 are passed through MMGW 405 for platform A 410, MMGW monitors and places the appropriate LID on messages (or message packets) from caller 401. This process of changing the LID of callee 411 is transparent to caller 401.

Figure 8:
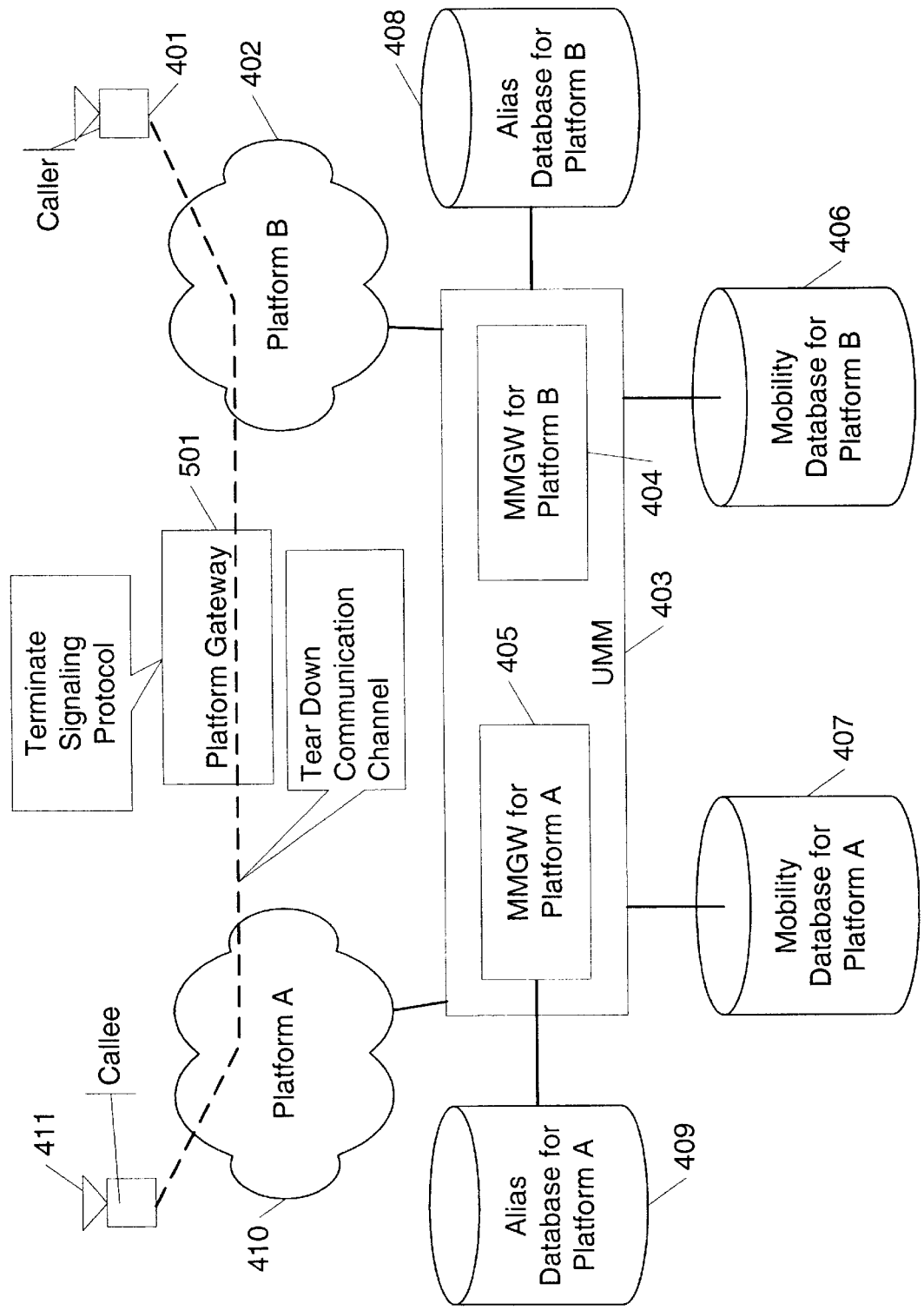
FIG. 8 shows an example of a call termination using the unified mobility management system in accordance with embodiments of the present invention.

FIG. 8 shows an example of a call termination using the unified mobility management system in accordance with embodiments of the present invention. When the communication channel has been terminated, the platform gateway controls the termination of the signal path between caller 401 and callee 411. The channel is torn down in the native protocol by each platform A 410 and platform B 401.

Figure 9:
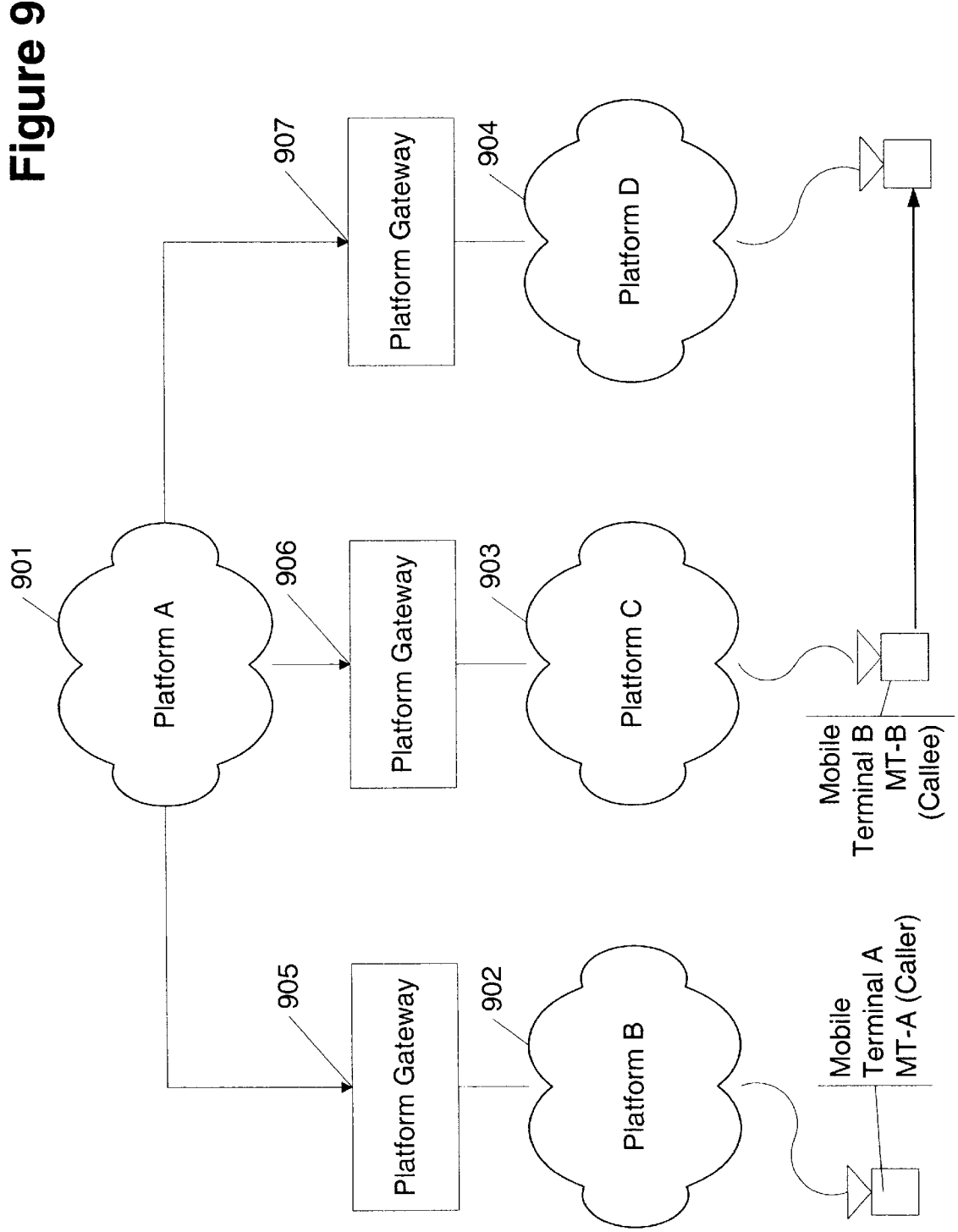
FIG. 9 shows another example of a call handoff using the unified mobility management system in accordance with embodiments of the present invention.

FIG. 9 shows another example of a call handoff using the unified mobility management system in accordance with embodiments of the present invention. In some situations, direct connection between a caller platform and a callee platform is not possible. In this example, a mobile terminal MT-A on platform B 902 communicates with mobile terminal MT-B on platform C 903 through platform A 901. Here, the communication pathway is established by using two platform gateways 905 and 906 to exchange messages (or message packets) between platform B 902 and platform A 901 and between platform A 901 and platform C 903. MT-B, originally in platform C 903, has moved to platform D 904. Now platform gateway 907 needs to be brought on-line and platform gateway 906 removed from the communication channel. One technique is to completely terminate the existing communication pathway between MT-A and MT-B. An alternative way is to maintain as parts of the pathway intact and to modify the segments that need modification based on a change in LID of one of the terminals MT-A or MT-B. The formation of the communication channel from caller MT-A to MT-B includes formation of the channel on platform B 902, then platform A 901, then platform C 903.

Figure 10:
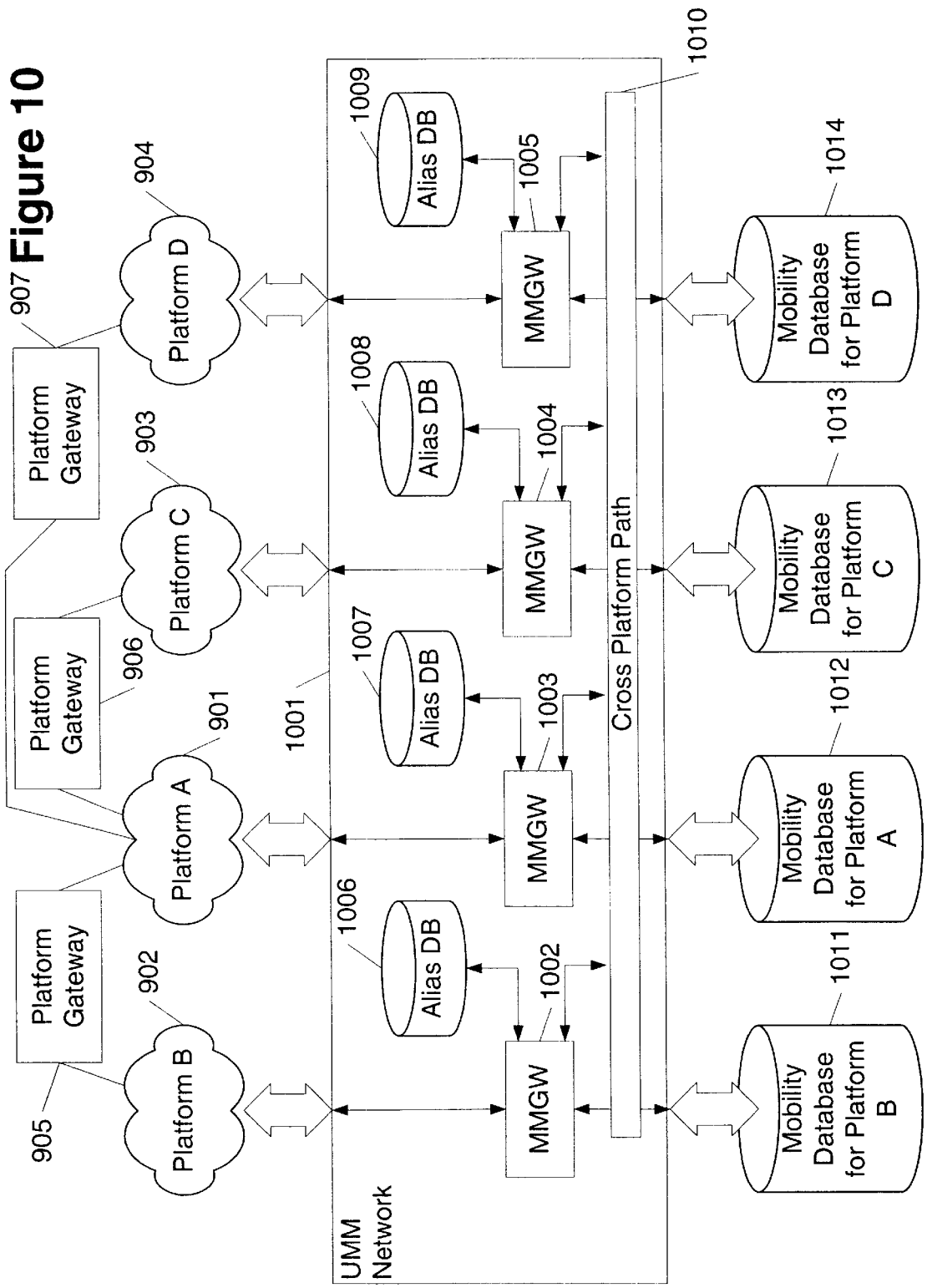
FIG. 10 shows a functional diagram of the unified mobility management system for handing off a call between network platforms in accordance with embodiments of the present invention.

FIG. 10 shows a functional diagram of the unified mobility management system for handing off a call between network platforms of FIG. 9 in accordance with embodiments of the present invention. UMM 1001 includes the MMGWs 1002–1005 and alias databases 1006–1009 for the platforms A-D 901–904. Also, UMM 1001 includes cross platform path 1010. In addition, each platform A-D 901–904 includes mobility databases 1011–1014.

To enable efficient handoffs, each platform gateway 905, 906 and 907 may include the TID and alias identifiers of MT-A and MT-B for the various platforms. The terminals MT-A and MT-B may have more than one native protocol and more than one home network or platform. For example, MT-A may be a dual-mode/multi-band telephone that functions in both a cellular (1G/2G) environment as well as in a mobile IP environment.

Figure 11:
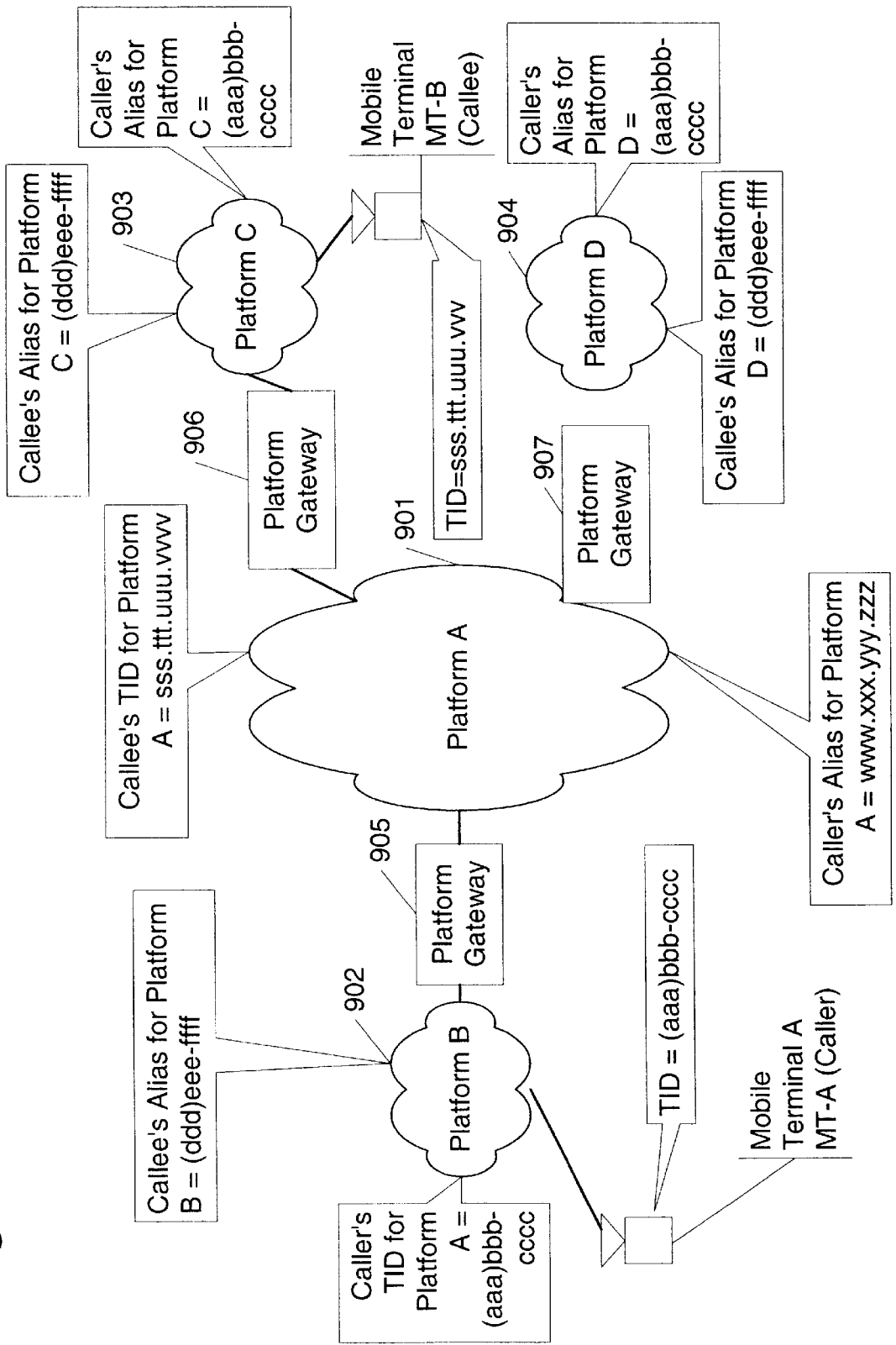
FIGS. 11 and 12 show examples of a cross platform handoff in accordance with embodiments of the present invention.
Figure 12:
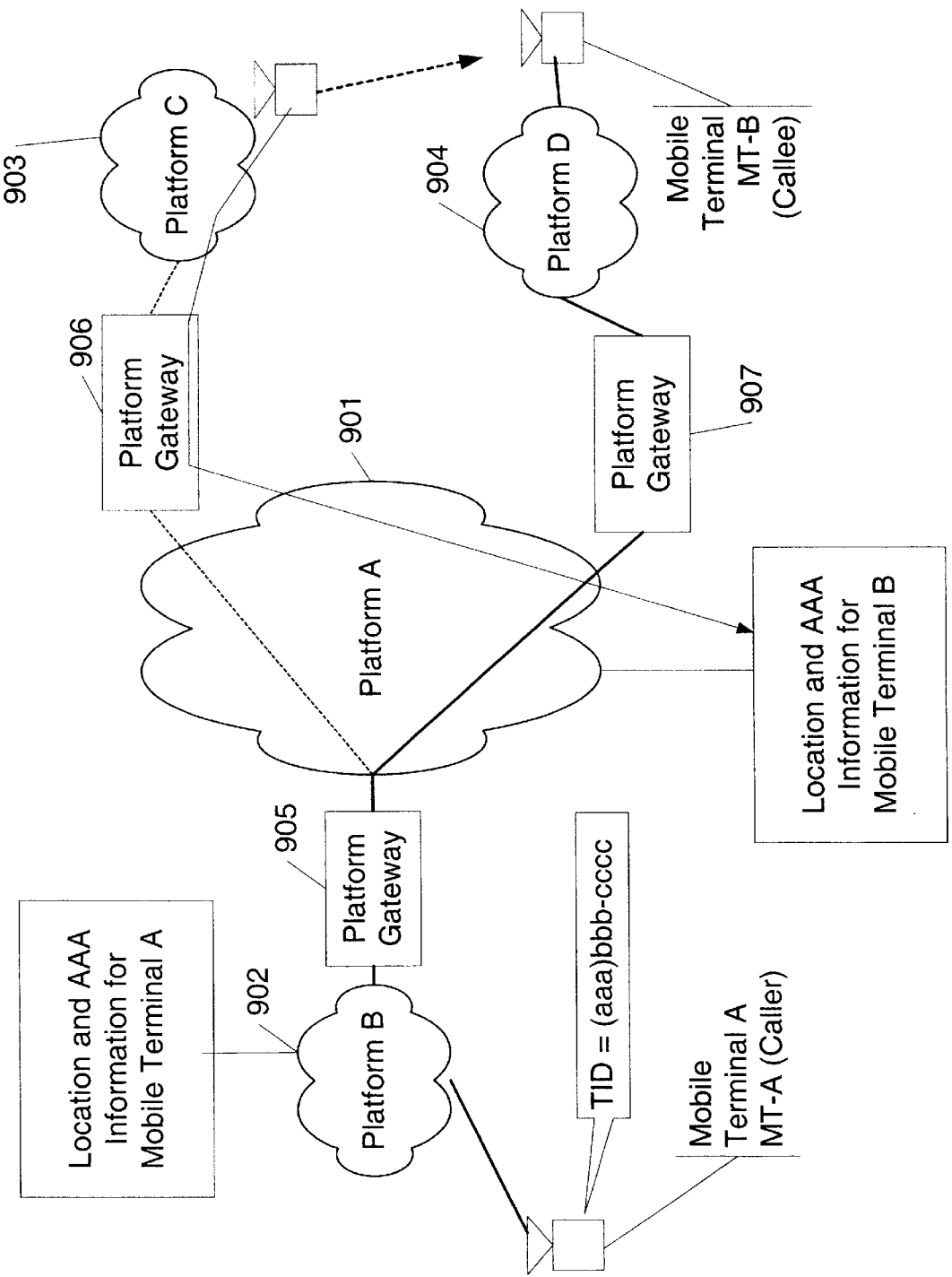

As an example for FIGS. 11 and 12, platform A 901 is considered to be a mobile IP platform, and platforms B 902, C 903, and D 904 are considered to be cellular platforms supporting, for instance, E.164. MT-A is provided with platform B 902 as being its home network. MT-B is described as having platform A 901 as its home network. The TIDs are described in relation to each of MT-A's and MT-B's home platforms.

For MT-A, its TID is (aaa) bbb-cccc on platform B 902. In addition, MT-A has alias for the other platforms. Here, the alias for MT-A on platform A 901 is www.xxx.yyy.zzz. The alias for MT-A on platform C 903 is (aaa) bbb-cccc. Finally, the alias for MT-A on platform D 904 is (aaa) bbb-cccc. Here, common aliases are provided for MT-A on the various platforms when possible. This is due to communication between the various databases to reserve the E.164 address to make it unique. It is appreciated that different alias may be provided when needed. For MT-B, its TID is sss.ttt.uuu-.vvv on platform A 901. For the cellular platforms B, C, and D, the alias is (ddd) eee-ffff. Using this arrangement of aliases, the communication path between MT-A and MT-B is established.

FIG. 12 shows the system for managing handoff between remote platforms. When MTB moves from platform C to platform D, it determines it location (through techniques well known in the art) and transmits its new location to the mobility database of the platform C. This may be referred to as a backward handoff. The handoff procedure may start prior to having a new communication pathway established at the new location. However, MT-B's native mobility database 1012 located on platform A 901. MMGW 1004 on platform C traps the location update message. By examining the message, MMGW 1004 determines that the native mobility database for MT-B is on platform A 901. MMGW 1004 next forwards the new location message to mobility database 1012. Based on this exchange, the handoff protocols on platforms A 901, C 903, and D 904 change to accommodate the change in location of MT-B. An example in the change in protocol includes MMGWs 1003, 1004 and 1005 modifying the header information they place on the messages (or message packets) as the packets are handled by the MMGWs. In particular, the address to send messages to in platform B will be rewritten to a new IP address in platform A (the mobile IP network) and a new path between the platform gateway and a new location will be created in platform B (the cellular network). Further, the alias database 1007 on platform A may contain routing information showing which platform gateway is preferable to reach a certain location in order to set up a cross-platform communication channel.

Figure 13:
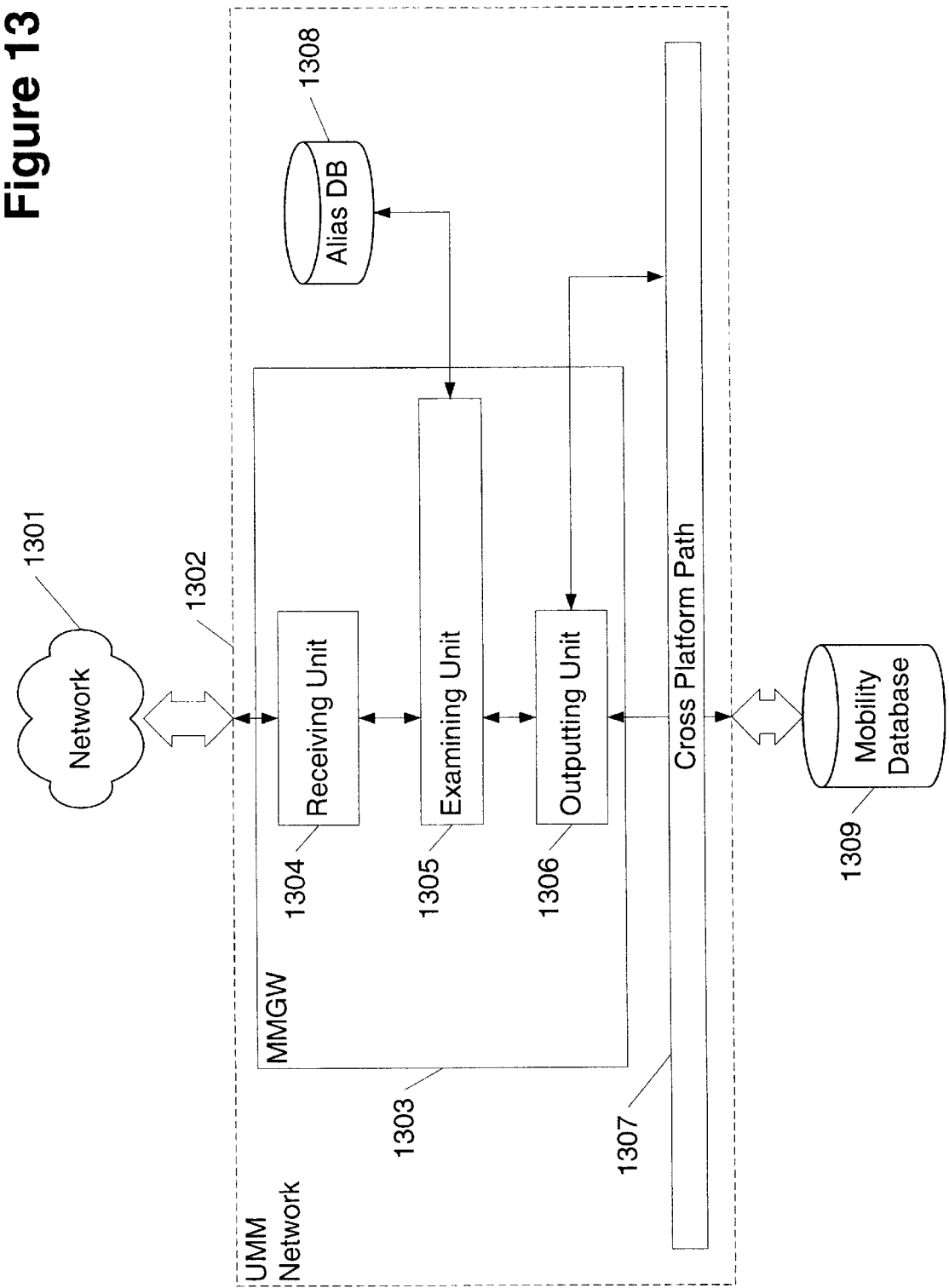
FIG. 13 shows an example of the internal components of a mobility management gateway in accordance with embodiments of the present invention.

FIG. 13 shows an example of the internal components of a mobility management gateway. FIG. 13 include networks 1301 connected to UMM network 1302. Also connected to the UMM network is mobility database 1309. Inside the UMM network is MMGW 1303. MMGW includes three functional components including receiving unit 1304 that receives messages from networks 1301 and mobile terminals attached to the networks 1301. MMGW 1303 also includes an examining unit 1305 that examines messages to be passed to mobility database 1309 and determines if the messages should be routed to other mobility databases through the cross platform path 1307. Finally, if the examining unit 1305 determines that the messages need to routed to other databases, it forwards the messages with the appropriate alias information to outputting unit 1306 that forwards the messages to the other mobility databases over the cross platform path 1307.

Figure 14:
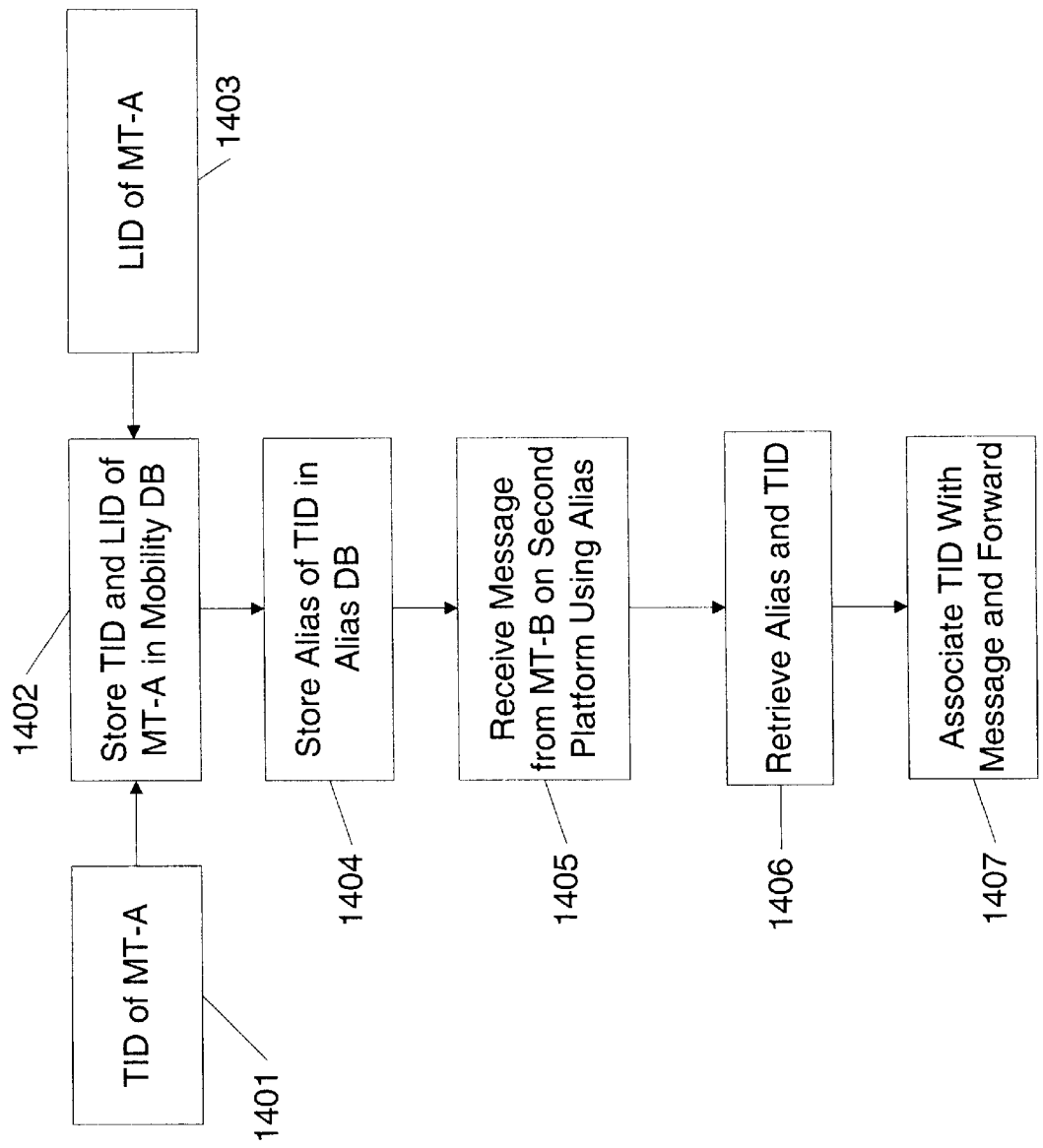
FIGS. 14–16 show process flows using alias databases in accordance with embodiments of the present invention.

FIG. 14 shows a process flow for storing aliases and operating with aliases as shown in the UMM of FIG. 4. Here, the TID 1401 and LID 1403 of MT-A are stored in the mobility database (step 1402). Next, the alias of the TID for other mobility databases are stored in the alias database (step 1404). The UMM receives a message from MT-B on a second platform using an alias TID (step 1405). The UMM retrieves the alias and TID from the alias database (step 1406). Finally, the MMGW of the UMM associates the retrieved TID the message and forwards it (step 1407).

Figure 15:
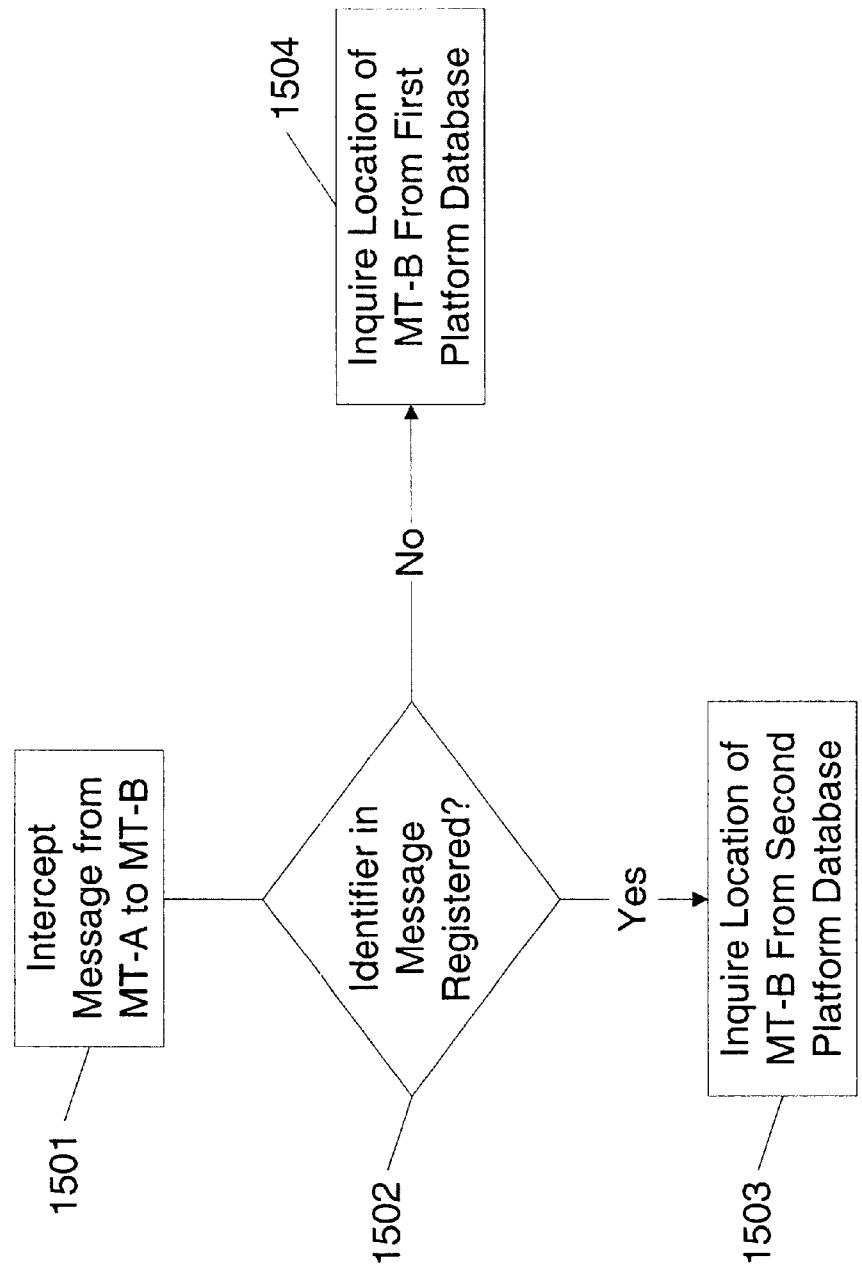

FIG. 15 shows a process performed by the MMGW for location resolution. As represented by step 1501, the MMGW intercepts a message from MT-A to MT-B. The MMGW next checks to determine whether an identifier in the message is registered in the alias database (step 1502). If the identifier has been registered, the MMGW inquires the location of the MT-B from the second platform mobility database (the native platform of MT-B) (step 1503). If the identifier has not been registered in the alias database, the MMGW inquires the location of the MT-B from the first platform database (step 1504).

Figure 16:
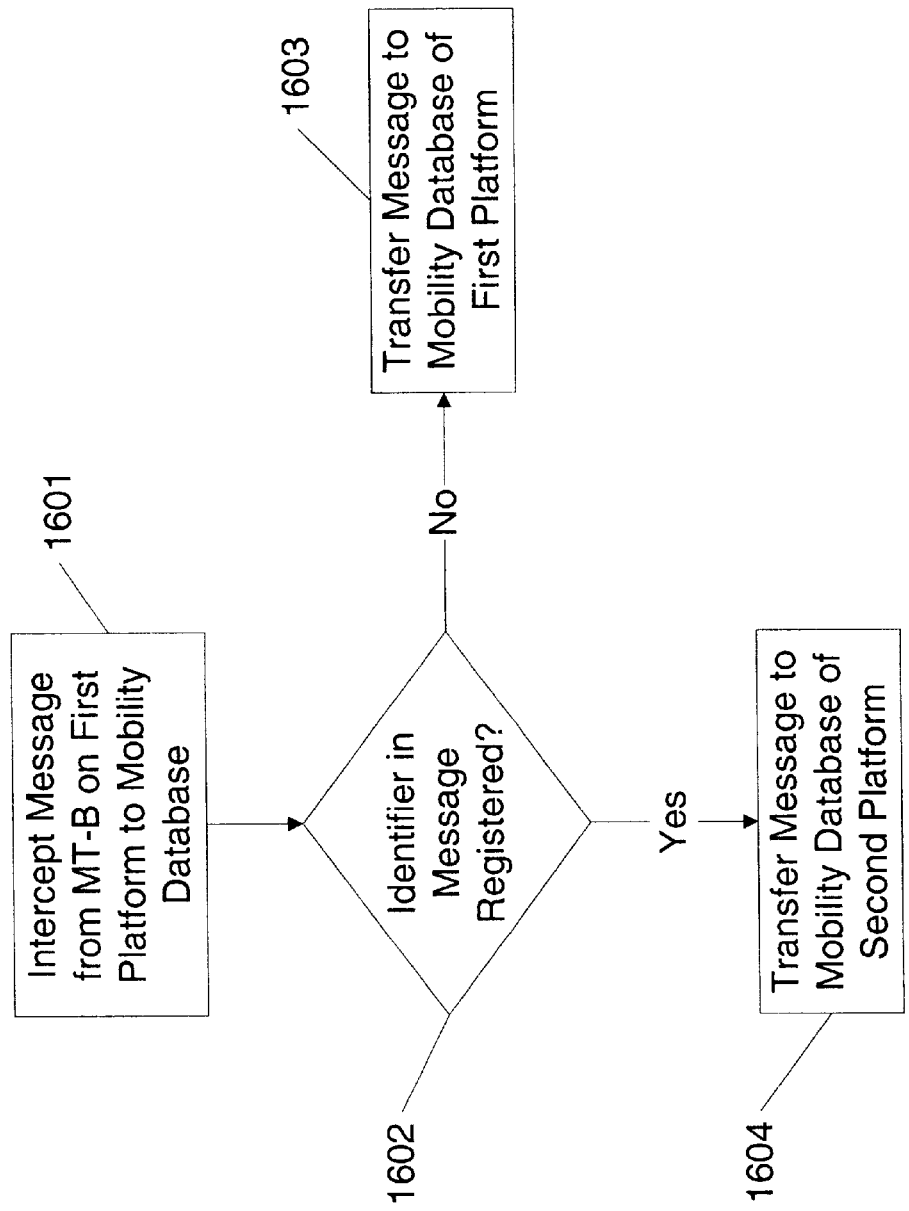

FIG. 16 shows a process performed by the MMGW for location registration. As represented by step 1601, the MMGW intercepts a message from MT-B on the first mobility platform as the message having been directed to the mobility database associated with the first mobility platform. The MMGW next checks to see if the identifier in the message has been registered in the alias database (step 1602). If the alias has been registered, the message is transferred to the mobility database of the second platform (step 1604). If not, the message is transferred to the mobility database of the first platform (step 1603).

In the foregoing specification, the present invention has been described with reference to specific exemplary embodiments thereof. Although the invention has been described in terms of various embodiments, those skilled in the art will recognize that various modifications, embodiments or variations of the invention can be practiced within the spirit and scope of the invention as set forth in the appended claims. All are considered within the sphere, spirit, and scope of the invention. The specification and drawings are, therefore, to be regarded in an illustrative rather than restrictive sense. Accordingly, it is not intended that the invention be limited except as may be necessary in view of the appended claims.

We claim:

1. A system for providing a network communications pathway between communication platforms comprising:

a first communication platform supporting a first protocol, said first communication platform associated with a first mobility database, said first mobility database storing plural pairs of a first terminal identifier and a first location identifier, each pair corresponding to a respective first mobile terminal on said first communication platform;

a second communication platform supporting a second protocol, said second communication platform associated with a second mobility database, said second mobility database storing plural pairs of a second terminal identifier and a second location identifier, each pair corresponding to a respective second mobile terminal on said second communication platform;

a first alias database storing a first alias of the first terminal identifier of said first mobile terminal in a form compatible with said second protocol;

a second alias database storing a second alias of the second terminal identifier of said second mobile terminal in a form compatible with said first protocol; and a mobility manager connected to both said first communication platform and said second communication platform, said mobility manager determining whether a destination of a first message is registered in said second alias database and, if the destination of the first message is registered in said second alias database, forwarding the first message to said second terminal corresponded with said second communication platform from said first terminal corresponded with said first communication platform, and determining whether a destination of a second message is registered in said first alias database and, if the destination of the second message is registered in said first alias database, forwarding the second message to said first terminal corresponded with said first communication platform from said second terminal corresponded with said second communication platform.

2. The system according to claim 1, further comprising:

a third communication platform supporting a third protocol, said third communication platform associated with a third mobility database, said third mobility database storing plural pairs of a third terminal identifier and a third location identifier, each pair corresponding to a respective third mobile terminal on said third communication platform,
wherein a third alias of said third terminal identifier is stored in said first alias database in a form compatible with said second protocol and a fourth alias of said third terminal identifier is stored in said second alias database in a form compatible with said first protocol.

3. The system according to claim 1, wherein the mobility manager receives from the first mobile terminal a message for resolving a location of the second mobile terminal and acquires the location of the second mobile terminal by referring to the second mobility database.

4. The system according to claim 1, wherein the mobility manager receives from the first mobile terminal a message containing the second alias of the second terminal identifier of the second mobile terminal, obtains the second terminal identifier of the second mobile terminal by referring to the second alias database, and inquires a location of the second mobile terminal of the second mobility database by using the second terminal identifier obtained.

5. The system according to claim 4, further comprising:
a gateway setting up a communication path from the first mobile terminal to the second mobile terminal by referring to the second alias database.

6. The system according to claim 5, wherein the gateway also sets up a reverse communication path from the second mobile terminal to the first mobile terminal by referring to the first alias database.

7. The system according to claim 1, wherein the mobility manager receives from the first mobile terminal a message containing the second alias of the second terminal identifier of the second mobile terminal, obtains the second terminal identifier of the second mobile terminal by referring to the second alias database, and registers a location of the second mobile terminal to the second mobility database by using the second terminal identifier obtained.

8. The system according to claim 1, wherein the first mobility database also stores at least one of accounting information and authentication information.

9. A method for communicating across communication platforms, comprising:
storing plural pairs of a first terminal identifier and a first location identifier, each pair corresponding to a respective first mobile terminal on a first communication platform in a first mobility database;
storing plural pairs of a second terminal identifier and a second location identifier, each pair corresponding to a respective second mobile terminal on a second communication platform in a second mobility database;
storing a first alias of said first terminal identifier in a first alias database;
storing a second alias of said second terminal identifier in a second alias database;
receiving a first message from the second mobile terminal on the second communication platform, said first message addressed with said first alias, and receiving a second message from said first mobile terminal on said first communication platform, said second message addressed with said second alias;
retrieving said first alias and said first terminal identifier from said first alias database and retrieving said second alias and said second terminal identifier from said second alias database; and
associating said first terminal identifier with said first message and forwarding said first message to said first communication platform, and associating said second terminal identifier with said second message and forwarding said second message to said second communication platform.

10. A mobility-managing device located between a first communication platform having a first mobility database and a first alias database and a second communication platform having a second mobility database and a second alias database, the device comprising:
a receiving unit configured to receive a message from the first communication platform, the message being for a communication between a first mobile terminal located at the first communication platform and a second mobile terminal;
an examining unit configured to examine the message received by the receiving unit to determine whether the second mobile terminal is serviced by the first communication platform or the second communication platform; and
an outputting unit configured to output the message to inquire a location of the second mobile terminal of said second mobility database when the examining unit determines that the second mobile terminal is serviced by the second communication platform,
wherein the examining unit determines that the second mobile terminal is serviced by the second communication platform when an identifier of the second mobile terminal contained in the message is registered in said first alias database associated with the first communication platform, the first alias database storing an alias of a terminal identifier of the second mobile terminal and the terminal identifier of the second mobile terminal, said alias being usable on the first communication platform and said terminal identifier being usable on the second communication platform, and
wherein the outputting unit outputs the message by using said terminal identifier of the second mobile terminal obtained from the first alias database.

11. A mobility-managing device located between a first communication platform having a first mobility database and servicing a first mobile terminal and a second communication platform having a second mobility database and servicing a second mobile terminal, the device comprising:
a receiving unit configured to receive a message from said first mobile terminal, said first message being destined for said second mobile terminal;
an examining unit configured to examine the message received by the receiving unit to determine whether said second mobile terminal is serviced by the first communication platform or the second communication platform, said examining unit searching a first alias database associated with said first communication platform; and
an outputting unit configured to output the message to a location of the second mobile terminal using said second mobility database associated with the second communication platform to locate the second mobile terminal when the examining unit determines that said second mobile terminal is serviced by the second communication platform.

12. A method of resolving a location of a mobile terminal across a first communication platform having a first mobility database and a first alias database and a second communication platform having a second mobility database and a second alias database, the method comprising the steps of:
intercepting a message from a first mobile terminal located at the first communication platform to a second mobile terminal;

determining that the second mobile terminal is serviced by the second communication platform when an identifier of the second mobile terminal contained in the message intercepted is registered as an alias of a terminal identifier of the second mobile terminal in said first alias database storing aliases and corresponding terminal identifiers of mobile terminals, wherein the terminal identifier is supported by the second communication platform; and inquiring a location of the second mobile terminal of said second mobility database associated with the second communication platform by using the terminal identifier of the second mobile terminal if the second mobile terminal is determined to be serviced by the second communication platform.

13. The method according to claim 12, further comprising the steps of:

determining that the second mobile terminal is serviced by the first communication platform when an identifier of the second mobile terminal contained in the intercepted message is not registered in said first alias database; and inquiring a location of the second mobile terminal of said first mobility database associated with the first communication platform.

14. A method of registering a location of a mobile terminal across a first communication platform having a first mobility database and a first alias database and a second communication platform having a second mobility database and a second alias database, the method comprising the steps of:

intercepting a message from a mobile terminal located at the first communication platform, the message being for a registration of a location of the mobile terminal;

determining that the mobile terminal is serviced by the second communication platform when an identifier of the mobile terminal contained in the intercepted message is registered as an alias of a terminal identifier of the mobile terminal in said first alias database storing aliases and corresponding terminal identifiers of mobile terminals, wherein the terminal identifier is supported by the second communication platform; and transferring the message to said second mobility database associated with the second communication platform by using the terminal identifier of the mobile terminal if the second mobile terminal is determined to be serviced by the second communication platform.

15. The method according to claim 14, further comprising the steps of:

determining that the mobile terminal is serviced by the first communication platform when an identifier of the mobile terminal contained in the intercepted message is not registered in said first alias database; and transferring the message to said first mobility database associated with the first communication platform by using the terminal identifier of the mobile terminal.

16. A system for providing a network communications pathway between communication platforms comprising:

a first communication platform supporting a first protocol, said first communication platform associated with a first mobility database, said first mobility database storing plural pairs of a first terminal identifier and a first location identifier, each pair corresponding to a respective first mobile terminal on said first communication platform;

a second communication platform supporting a second protocol, said second communication platform associated with a second mobility database, said second mobility database storing plural pairs of a second terminal identifier and a second location identifier, each pair corresponding to a respective second mobile terminal on said second communication platform;

an alias database storing an alias of the first terminal identifier of said first mobile terminal in a form compatible with said second protocol; and a mobility manager connected to both said first communication platform and said second communication platform, said mobility manager checking whether a destination of a first message is registered in said alias database and, if the destination of the first message is registered in said alias database, forwarding the first message to said first mobile terminal from said second mobile terminal.

* * * * *

UNITED STATES PATENT AND TRADEMARK OFFICE
CERTIFICATE OF CORRECTION

PATENT NO. : 6,654,607 B1  
APPLICATION NO. : 09/504106  
DATED : November 25, 2003  
INVENTOR(S) : Shobatake et al.

Page 1 of 1

It is certified that error appears in the above-identified patent and that said Letters Patent is hereby corrected as shown below:

In the Specification

Column 2, Line 16, delete "password" and insert -- password, --, therefor.

Column 7, Line 37, delete ""bob.domainname.com"" and insert -- "bob.domainname.com") --, therefor.

Column 7, Line 40, delete "platform A 402," and insert -- platform A 410, --, therefor.

Signed and Sealed this
Twenty-fourth Day of February, 2015

Michelle K. Lee
*Deputy Director of the United States Patent and Trademark Office*